UNITED STATES PATENT OFFICE.

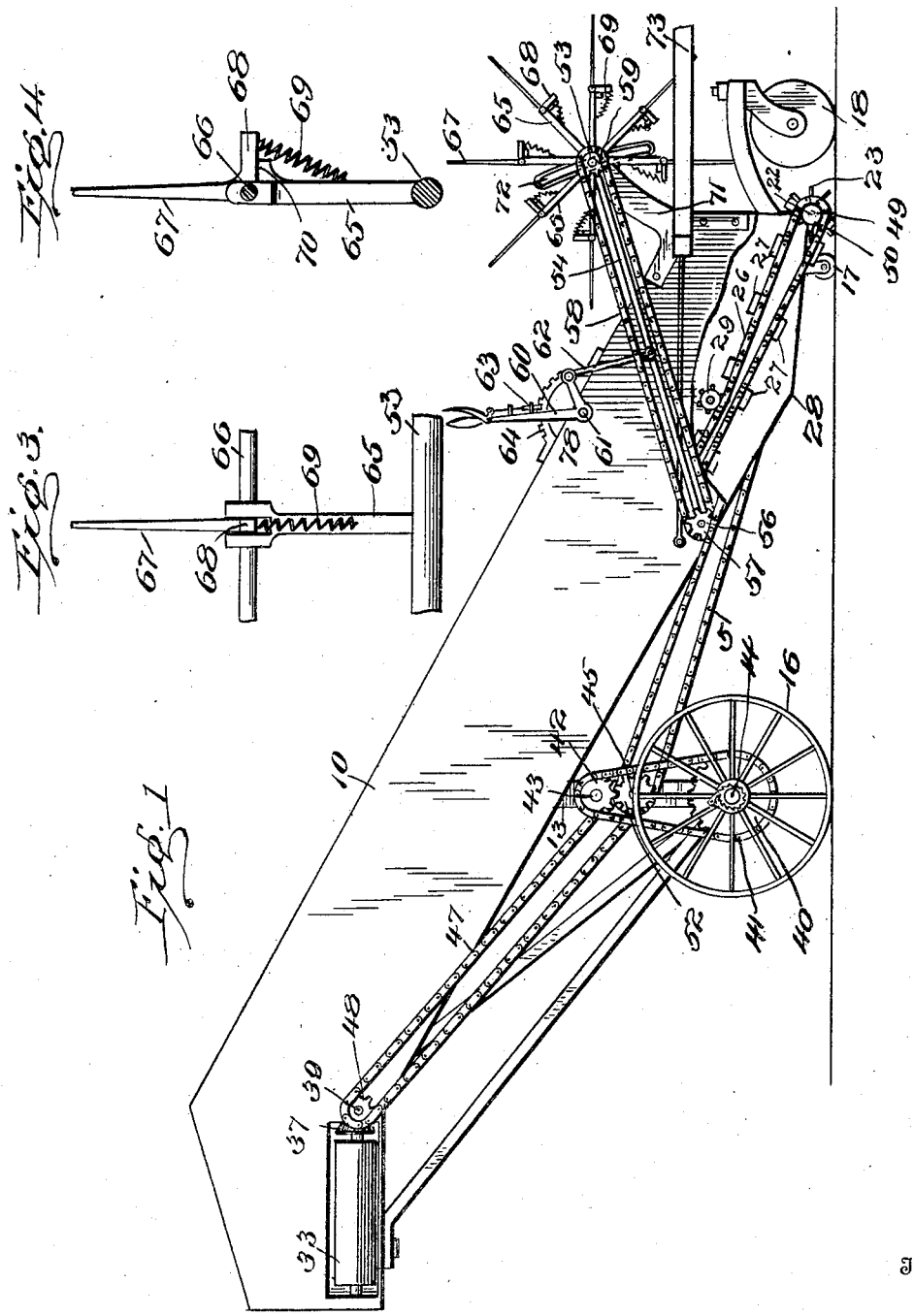

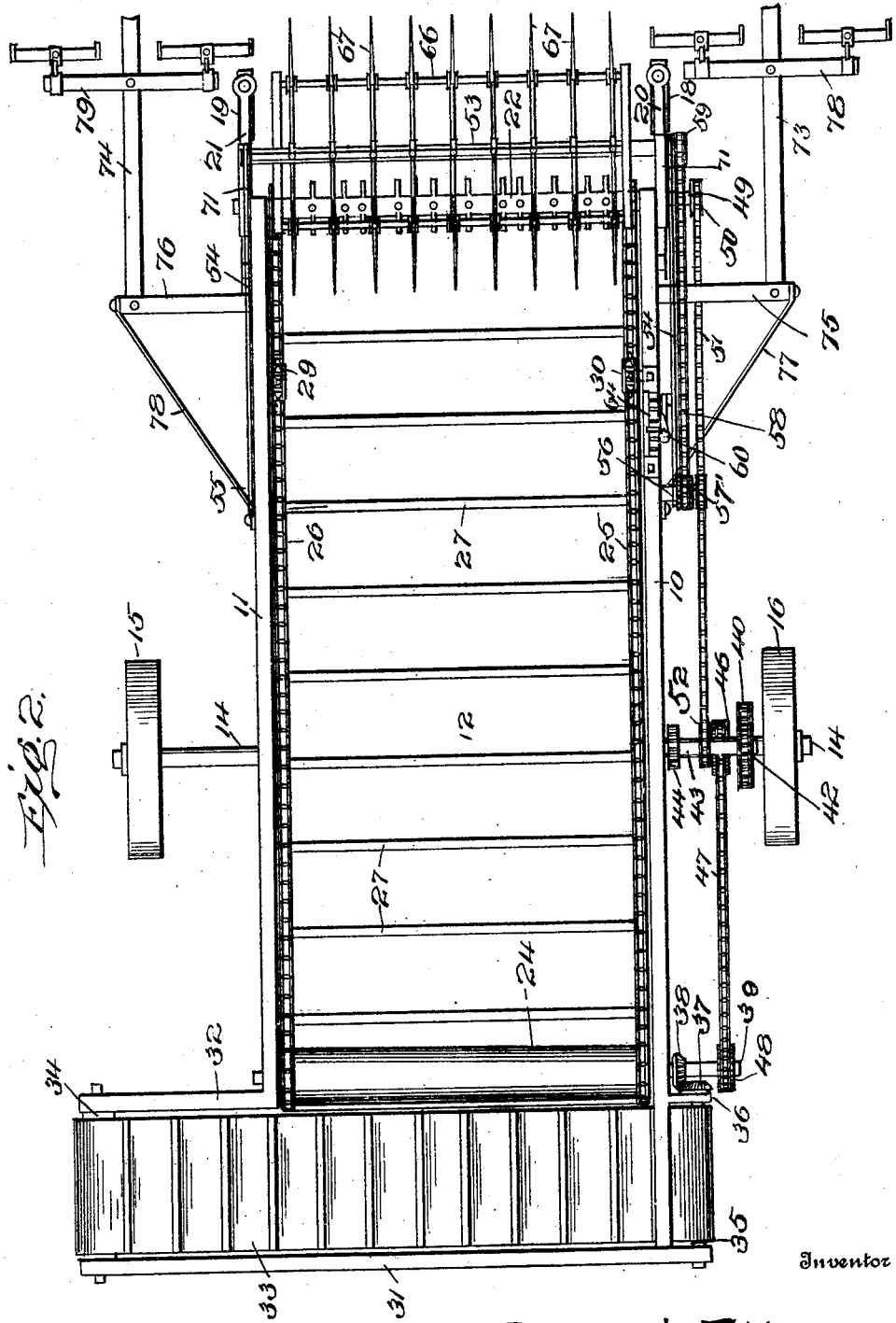

BENJAMIN FRANK KEPNER, OF PECATONICA, ILLINOIS.

GRAIN-LOADING MACHINE.

937,814.

Specification of Letters Patent.

Patented Oct. 26, 1909.

Application filed April 2, 1906. Serial No. 309,389.

*To all whom it may concern:*

Be it known that I, BENJAMIN F. KEPNER, a citizen of the United States, residing at Pecatonica, in the county of Winnebago and State of Illinois, have invented certain new and useful Improvements in Grain-Loading Machines; and I do hereby declare the following to be a full, clear, and exact description of the invention, such as will enable others skilled in the art to which it appertains to make and use the same.

This invention relates to grain loading machines, and has for an object to provide a device of the class adapted for gathering up and elevating the several bundles or sheaves of a shock of grain and depositing the bundles in a wagon or other vehicle driven beside the loader.

A further object of the invention is to provide in connection with the loader of the class described, a reel having sheaf engaging fingers resiliently connected therewith, and whereby the several fingers are adapted to yield to excessive resistance to prevent breakage.

A still further object of the invention is to provide a loader of the class described embodying a spiked cylinder at the lower forward edge adapted to engage the butts of the sheaves and to lift them and to deposit them upon the conveyer of the loader.

With these and other objects in view, the invention comprises certain novel constructions, combinations and arrangements of parts, as will be hereinafter fully described and claimed.

In the accompanying drawings:—Figure 1 is a view of the improved loader in side elevation. Fig. 2 is a top plan view of the loader. Fig. 3 is a detail front elevation of one of the fingers of the reel and its associated parts. Fig. 4 is a detail view of one of the fingers of the reel shown in connection with its associated parts, and the longitudinal rods of the reel in section.

Like characters of reference designate corresponding parts throughout the several views.

In its preferred embodiment the improved loading machine, forming the subject-matter of this application, comprises side pieces 10 and 11, parallel with each other and spaced apart to provide an interval for the accommodation of the conveyer, as 12, therebetween. The side pieces 10 and 11 are carried on a frame, as 13, erected upon an axle 14 to which are secured the driving wheels 15 and 16, by the usual and ordinary ratchet connection. The side pieces 10 and 11 are disposed at an inclination the forward end being the lower, and under the forward end is disposed a bearing roller 17 positioned to travel upon the ground and with caster wheels 18 and 19 secured in front of the forward end by means of brackets 20 and 21.

At the lower end a cylindrical roller 22 is disposed transversely between the side pieces 10 and 11, and provided with fingers or teeth 23 extending rigidly therefrom. About the cylindrical roller 22 the conveyer 12 is arranged to operate, a roller 24 being arranged at the upper end of the said side pieces 10 and 11 and extending transversely therebetween to carry the conveyer at the end opposite the cylinder 22. The conveyer 12 may be constructed in any usual and approved manner, but preferably of the sprocket chains 25 and 26 passing over the said rollers 22 and 24 and connected by transverse slats or bars 27. It will be noted that the side pieces 10 and 11 form an angle, as at 28, upon their lower sides adjacent the forward end and to adjust the conveyer 12 to conform to such angle, sprockets 29 and 30 are provided upon the inner surface of the side pieces and in position to engage and bear upon the sprocket chains 25 and 26.

At the upper end the side pieces 10 and 11 are provided with transversely extending frame pieces 31 and 32, spaced apart to accommodate the conveyer 33 of any approved form and construction, carried upon rollers 34 and 35 disposed transversely between the frame pieces 31 and 32 at one end and between the frame piece 31 and bracket 36 at the opposite end. The roller 35 is provided with a gear 37 arranged to engage a gear 38 upon the shaft 39, forming the axis of the roller 24.

Upon the axle 14 is rigidly mounted a sprocket wheel 40 carrying a sprocket chain 41, which passes about the sprocket wheel 42, journaled upon the frame 13, above the axle 14. The sprocket 42 is mounted upon a shaft 43, which carries a wheel 44 arranged to rotate a shaft 45. The shaft 45 is provided with a sprocket wheel 46, over which passes a sprocket chain 47 engaging at its opposite end a sprocket wheel 48, rigidly mounted upon the shaft 39 and by which the said shaft is rotated.

The cylinder 22 is provided at one end with an extended shaft 49, upon which is rigidly secured a sprocket wheel 50 over which passes a chain 51 engaging at its opposite end a sprocket wheel 52, upon and rotated by the shaft 45.

To throw the bundles or sheaves upon the conveyer 12, a reel is provided, mounted upon a shaft 53, journaled in the extremities of arms 54, pivotally secured to the side pieces 10 and 11, as at 55, and on the stud 56. Upon the stud 56 is also mounted a sprocket 57, engaging and receiving motion from the chain 51 and rigidly associated with the sprocket 57' and over which passes a sprocket chain 58, engaging at its opposite end the sprocket 59, upon the shaft 53 of the reel. The reel may be raised or lowered by means of the bell crank lever 60 pivoted, as at 61, to the side pieces 10 and provided with a link 62, pivotally connected with the arms 54 and with the usual spring-pressed pawl 63, engaging the segmental rack 64.

The reel comprises the central shaft 53, from which extend radial arms 65, upon the extremities of which are journaled rods 66, extending parallel with the central shaft 53. Rigidly secured to the shaft 66 are a plurality of fingers 67, extending normally in alinement with the arms 65 and radial to the reel. The fingers 67 are provided with arms or lugs 68, disposed at right angles to the finger 67, and normally substantially at right angles to the arms 65, and retained yieldingly in such position by means of springs 69, the movement in one direction being limited by a shoulder 70, carried by the arm 65.

While the reel may be carried simply upon the extremities of the arm 54, it is found desirable for added strength to employ brackets 71, provided with slots 72, disposed concentric with the studs 55 and 56, so that the shaft 53, which extends through the said slot 72, may move therein upon an arc with the said studs 55 and 56 as the center.

For moving the machine, as shown, draft may be applied in any approved manner, here shown as the tongues or poles 73 and 74, secured in any approved manner as by the struts 75 and 76, and braces 77 and 78, and to which are secured the usual whiffletrees 78 and 79.

In operation the improved loader is drawn so that the draft animals attached to the poles 73 and 74 are upon opposite sides of the standing shock of grain, which is engaged at the top by the reel and at the bottom by the cylinder 22 to throw the component bundles upon the conveyer 12. The bundles upon the conveyer 12 are thereby conveyed to and dumped upon the transversely moving conveyer 33, and thereby conveyed to and dumped upon a vehicle driven beside the loader in convenient position. In case the shock of grain is a large one, or the bundles thereof unusually heavy, the fingers 67 which engage the bundles will yield, and only a portion of the bundles will be thrown upon the conveyer at one time, thereby insuring a proper elevation of the bundles.

What I claim is:—

1. In a machine of the class described, traction wheels, a frame mounted upon the wheels, a conveyer mounted upon the frame, a spiked cylinder carried by the frame in position for contact with the ground to throw material upon the conveyer, and a reel positioned to engage objects and throw them upon the conveyer.

2. A machine of the class described comprising traction wheels, a frame mounted upon the traction wheels, and in an inclined position, the forward end being the lower, a conveyer mounted upon the frame and arranged to convey material from the forward and lower end to the upper and rearward end, a spiked cylinder adjacent the lower end and arranged for operative contact with the ground, and to raise and deposit material upon the conveyer, a reel mounted adjacent the forward end, and comprising fingers disposed normally radial to the reel, means connected with the fingers to permit an angular movement thereof, means to adjust the reel vertically, and a second conveyer arranged at the upper end of the frame, and positioned to receive material from the first-mentioned conveyer and to move it transversely relative thereto.

3. In a machine of the class described, a wheeled vehicle comprising side pieces and a bottom, the said bottom being disposed in an inclined position with its forward end the lower and with a bend adjacent the forward end, a conveyer mounted between the side pieces and above the bent bottom, means whereby the conveyer is operated from the wheels.

4. In a machine of the class described, a wheeled vehicle embodying side pieces, and a bottom, the said bottom being disposed at an inclination throughout the greater portion of its length and with the lower end forward, the said forward end being bent to occupy substantially a horizontal plane, rollers mounted adjacent the opposite ends of the vehicle, a conveyer mounted upon the rolls, and means connecting the rolls and wheels.

5. In a machine of the class described, a wheeled vehicle embodying a body having spaced side pieces, disposed at an inclination and in a vertical plane, and a bottom disposed at an inclination throughout the greater portion of its length and with its forward end the lower and disposed adjacent the ground, and bent to provide a section disposed substantially in a horizontal plane, rolls journaled adjacent the opposite ends of the vehicle body, a conveyer mounted upon the rolls, and within the body, and transmission means connecting the wheels and rolls.

In testimony whereof I affix my signature in presence of two witnesses.

BENJAMIN FRANK KEPNER.

Witnesses:
J. A. PROVOOST,
H. W. KNOWLTON.